Patented July 13, 1937

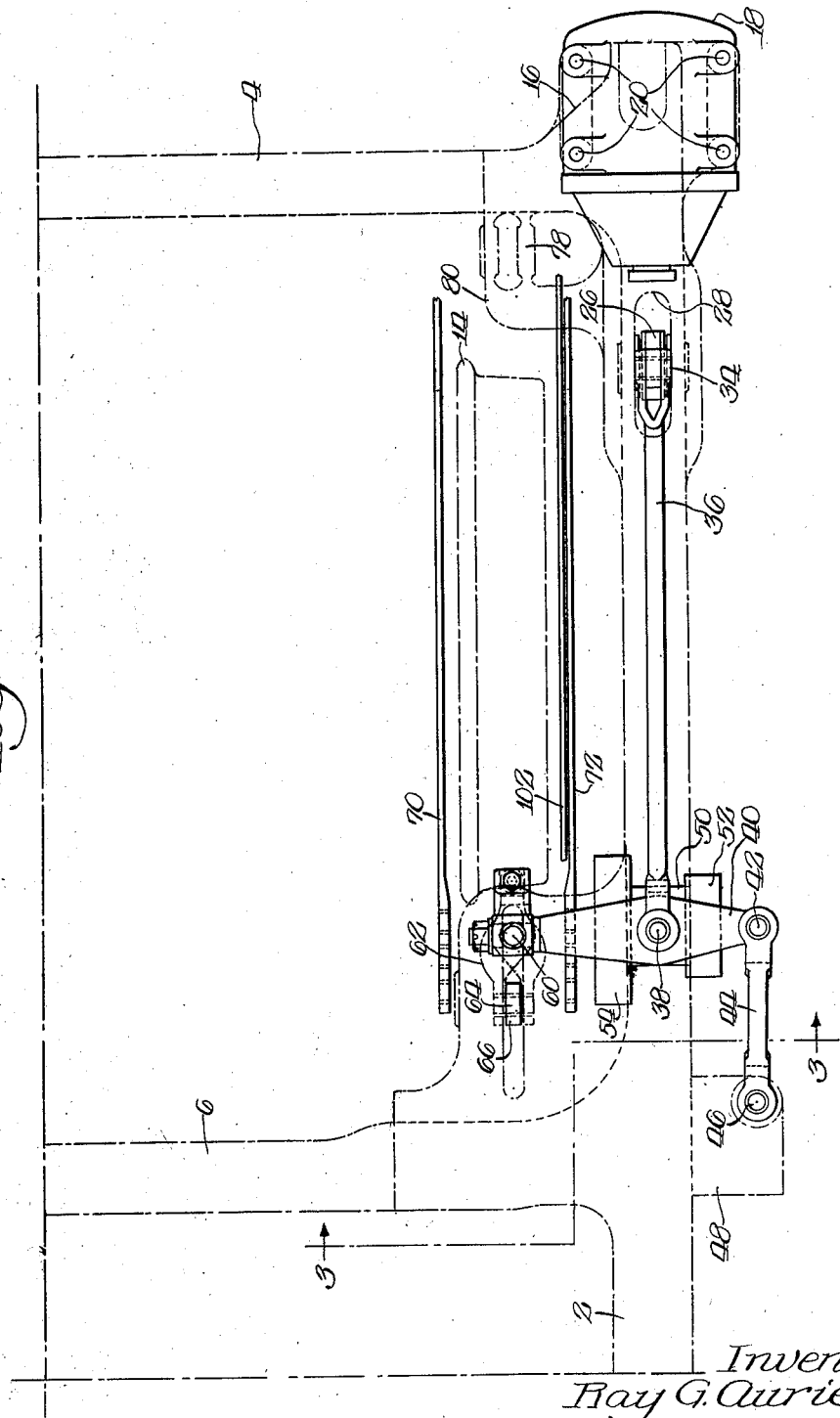

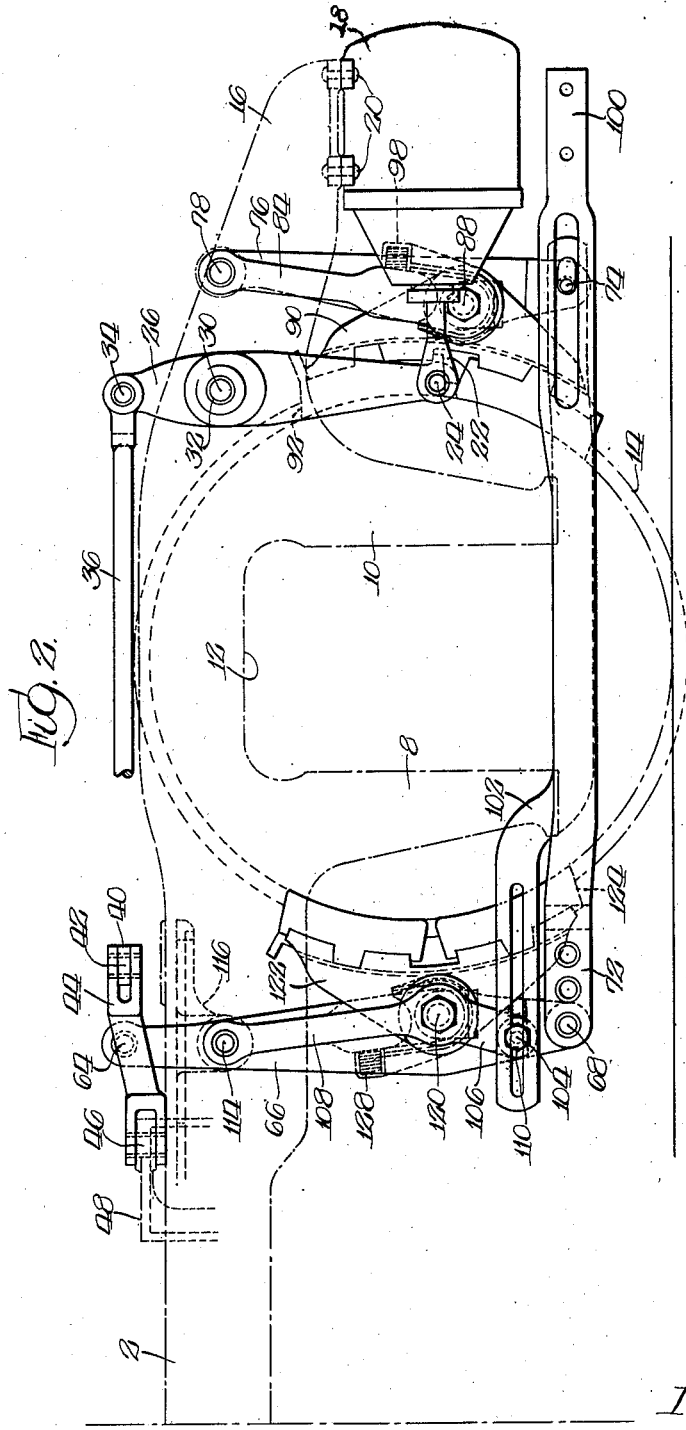

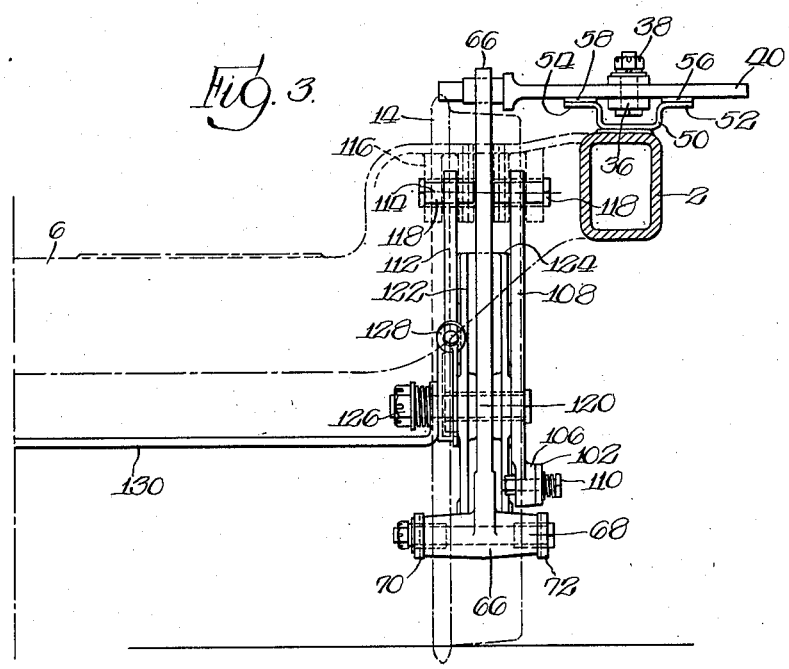
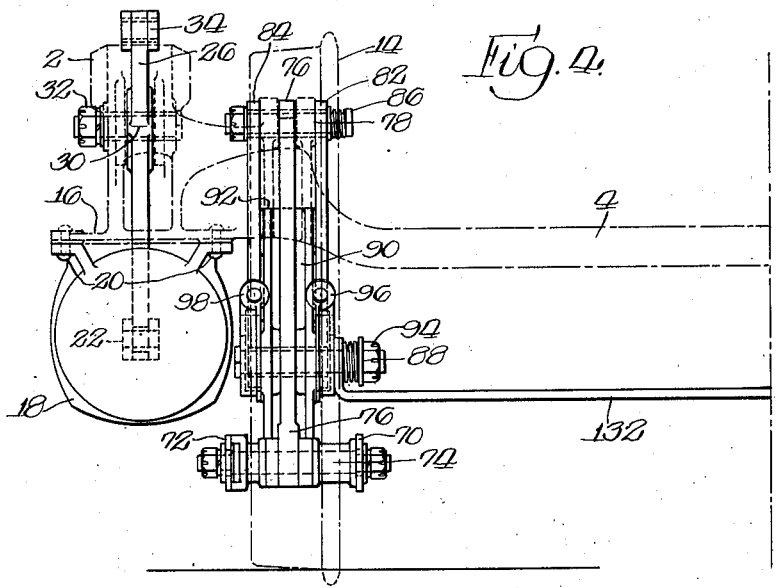

2,086,840

UNITED STATES PATENT OFFICE 2,086,840

CLASP BRAKE

Ray G. Aurien, Chicago, Ill., assignor to American Steel Foundries, Chicago, Ill., a corporation of New Jersey Application October 23, 1936, Serial No. 107,272

20 Claims. (Cl. 188—56)

My invention relates to railway brake rigging and more particularly to a rigging commonly known as clasp brakes wherein brake heads and brake shoes are applied to opposite sides of each car wheel.

An object of my invention is to provide clasp brake rigging for a four wheel railway car truck having a relatively long wheel base and designed particularly for use on recently developed high-speed trains wherein the truck is required to have an exceptionally low center of gravity. Trucks designed for such use are frequently subjected to conditions wherein it is impractical or impossible for the brake rigging at one end of the truck to be interconnected with the brake rigging at the other end of the truck as has been more common in brake rigging heretofore used.

It is a further object of my invention to provide such a car truck with a brake rigging operated independently at the respective ends of the truck and wherein the power means will be mounted at the opposite ends of the truck for operation of the rigging at the respective ends.

Still another object of my invention is to provide a brake rigging for a railway car truck wherein a plurality of power means will be mounted on each end of the truck, designed to operate in conjunction to control the brake rigging at the respective truck ends.

Yet another object of my invention is to design a brake rigging for a railway car truck which will conserve a maximum amount of space for the arrangement of the car body and the other equipment normally associated therewith in a high-speed train having an exceptionally low center of gravity.

With these and various other objects in view my invention may consist of certain features of construction and operation as will be more fully described and particularly pointed out in the specification, drawings and claims appended hereto.

In the drawings which illustrate embodiments of the device and wherein like reference characters are used to designate like parts—

Figure 1 is a top plan view of a truck construction embodying my invention, only one side and one end being shown since the construction is similar at the opposite sides and at the respective ends of the truck;

Figure 2 is a side elevation of the truck and brake structure shown in Figure 1;

Figure 3 is a sectional view, the section being taken substantially in the plane indicated by the line 3—3 of Figure 1; and Figure 4 is an end elevation, the view being taken from the right as seen in Figures 1 and 2.

The truck comprises side frames 2—2 integrally joined at their corresponding ends by end rails 4 and also integrally joined adjacent the transverse center line of the truck by the spaced load carrying members or transoms 6 providing supporting means for the bolster (not shown) carried therebetween, the car body being supported upon the bolster in the usual manner. Adjacent each end, each side frame has the integrally formed column guides 8 and 10 forming therebetween the opening 12 and thus providing the usual manner of cooperation through the medium of a journal box (not shown) with the wheel and axle assembly 14.

At its opposite ends and adjacent its juncture with the end rail, each side frame has the longitudinally extending bracket 16 forming a support means for the power means or brake cylinder 18 which is secured thereto as by means of rivets 20—20. The cylinder piston 22 is pivotally connected as at 24 to the lower end of the dead cylinder lever 26, the upper end of said cylinder lever extending through the elongated slot 28 formed substantially on the longitudinal center line of the truck side frame 2, the said cylinder lever being pivotally supported intermediate its ends as at 30 by the bolt and nut assembly 32 (Figure 4) extending through the opposite vertical walls of the side frame. The upper end of the cylinder lever 26 is pivotally connected as at 34 to the pull rod 36, the opposite end of said pull rod having a pivotal connection as at 38 to a point intermediate the ends of the auxiliary lever 40, said auxiliary lever having a pivotal connection at its outer end as at 42 with the swiveling link 44, the opposite end of said link having a pivotal connection as at 46 with the fulcrum bracket 48 integrally formed on the upper portion of the outer wall of the side frame 2. Sliding support for the auxiliary lever 40 on the side frame 2 is provided in the form of the channel-shaped bracket 50 (Figure 3), the outer and inner flanges 52 and 54 thereof having engagement respectively with the wear plates 56 and 58 formed on the bottom side of the auxiliary lever 40. The inner end of the auxiliary lever 40 is pivotally connected as at 60 to the universal link or clevis means 62, the opposite end of said clevis means having a pivotal connection as at 64 to the upper end of the live truck lever 66, the lower end of said live truck lever 66 having a pivotal and adjustable connection as at 68 to the inner and outer paired straps 70 and 72, the opposite ends of said straps being pivotally and adjustably connected as at 74 to the lower end of the dead lever 76, the upper end of said dead lever having a pivotal connection as at 78 to the bracket 80 integrally formed with the side frame and end rail adjacent their juncture. Likewise supported from the bracket 80 at the pivotal point 78 and on opposite sides of the dead lever 76 are the inner and outer paired hangers 82 and 84 (Figure 4), all of said connections at the pivotal point 78 being made secure by the bolt and nut assembly 86. At the lower ends of the paired hangers 82 and 84 and pivotally supported therebetween as at 88 is the brake head 90 and the associated brake shoe 92 arranged for cooperation with the periphery of the adjacent wheel. The connection of the brake head 90 with the inner and outer paired hangers 82 and 84 and the dead lever 76 all at the pivotal point 88 is secured by means of the bolt and nut assembly 94, and inner and outer balancing means 96 and 98 provide the proper adjustment for the brake head 90 in its relation to the hangers 82 and 84 respectively.

The pivotal connection 74 between the lower end of the dead lever 76 and the paired straps 70 and 72 is made adjustable as by means of the shim type slack adjuster 100 which operates in conjunction with the adjuster bar 102, said adjuster bar having its outer slotted end connected also at the pivotal point 74 and its inner slotted end pivotally connected as at 104 to the downwardly projecting lower end 106 of the hanger 108, the connection of the adjuster bar 102 with the hanger end 106 being secured as by means of the bolt and nut assembly 110. Operating in conjunction with the outer hanger 108 is the inner hanger 112 (Figure 3), said hangers being pivotally supported at their upper ends as at 114 from the bracket 116 integrally formed with the side frame 2, being secured thereto as by the pins 118—118. At their lower ends and intermediate the hangers 108 and 112 is pivotally supported as at 120 the brake head 122 with its associated brake shoe 124 arranged for cooperation with the opposite periphery of the adjacent wheel. Also connected at the pivotal point 120 is the live truck lever 66, all of said parts at said pivotal point 120 being secured as by the bolt and nut assembly 126. Proper positioning of the brake head 122 with respect to the hanger 112 is maintained by the balancing means 128.

Intermediate the wheels the brake head tie strap 130 is connected to the brake head 124 at the pivotal point 120 through the medium of the bolt and nut assembly 126, the opposite end of said tie strap 130 being likewise connected to the brake head at the opposite side of the truck with its associated hanger and lever assembly. Also outwardly of the wheels, the brake head tie strap 132 serves as a similar connection between the brake head 90 with its associated hanger and lever assembly and the corresponding brake head and its hanger and lever assembly at the opposite side of the truck.

It will be recognized of course that the brake cylinder 18 operates in conjunction with a similar power means at the opposite side of the truck to actuate the brake mechanism at one end thereof and that a similar set of power means is located at the other end of the truck for actuation of the brake rigging associated with that end of the truck.

In operation, actuation of the power means 18 causes the cylinder lever 26 to rotate in a clockwise direction about the pivot point 30 intermediate its ends, thus moving the pull rod 36 to the right (Figures 1 and 2) and rotating the dead auxiliary lever 40 in a clockwise direction about its pivotal point of connection 42 with the link 44, thus actuating the live truck lever 66 through the universal link 62 and causing said live truck lever 66 to rotate in a clockwise direction about the pivot point 68 at its lower end, until the brake shoe 124 is brought into engagement with the periphery of the adjacent wheel. Continued actuation causes the live truck lever 66 to rotate in a clockwise direction about the pivot point 120 intermediate its ends, thus moving the paired straps 70 and 72 to the left (Figures 1 and 2) and causing the dead lever 76 to rotate in a clockwise direction about its pivotal point of support 78 until the brake shoe 92 supported intermediate the ends of said hanger lever is brought into engagement with the opposite periphery of the said wheel. Release of the power means causes the various parts to operate in directions reverse to those just described until the parts have assumed their normal inoperative position.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a railway car truck the combination of a truck frame comprising side members, spaced transoms and end rails integrally formed therewith, wheel and axle assemblies, power means mounted at the opposite ends of each of said side members, fulcrum means on each of said side members on opposite sides of the transverse center line of said truck, pairs of live and dead truck levers supported on opposite sides of each of said assemblies, the live and dead levers of each pair having their lower ends pivotally and adjustably connected to each other, pairs of auxiliary levers slidably supported on said side members and having their outer ends connected respectively to said fulcrum means and their inner ends connected respectively to said live truck levers, and cylinder levers fulcrumed intermediate their ends adjacent each of said power means and having their lower ends pivotally connected respectively to the adjacent power means and their upper ends operatively connected respectively to points intermediate the ends of said auxiliary levers.

2. In a railway car truck the combination of a truck frame comprising a side frame, wheel and axle assemblies, power means mounted at the opposite ends of said side frame, fulcrum means mounted on said side frame on opposite sides of the transverse center line thereof, dead truck levers supported outwardly of the wheels, live truck levers supported intermediate the wheels, auxiliary levers supported on said side frame adjacent said fulcrum means and having their outer ends operatively connected respectively thereto and their inner ends connected respectively to said live truck levers, cylinder levers fulcrumed intermediate their ends adjacent said power means and having their lower ends connected respectively thereto, and pull rods connecting the upper ends of said cylinder levers respectively to points intermediate the ends of said auxiliary levers.

3. In a railway car truck the combination of a truck frame including side members and end rails connected therebetween, wheel and axle assemblies, power means supported from said frames adjacent the junctures of said side members and said end rails, vertical openings on the longitudinal center line of each of said side members adjacent said power means, fulcrum means on each of said side members adjacent the transverse center line thereof, live and dead truck levers supported on opposite sides of said assemblies, straps connecting the lower ends of said levers associated with each wheel, auxiliary levers supported on said side members and having their outer ends connected to said fulcrum means and their inner ends connected respectively to said live truck levers, cylinder levers fulcrumed intermediate their ends in said openings and having their lower ends connected respectively to said power means, and pull rods connecting the upper ends of said cylinder levers respectively to points intermediate the ends of said auxiliary levers.

4. In brake rigging for a railway car truck the combination of a truck frame comprising side members, spaced transoms and end rails integrally formed therewith, wheel and axle assemblies, power means secured to said side members adjacent each end thereof, vertical openings in each of said side members adjacent each of said power means, a pair of live and dead truck levers associated with each wheel and connected at their lower ends to each other, a pair of auxiliary levers supported on each side member and having their outer ends fulcrumed therefrom and their inner ends connected respectively to the adjacent live truck lever, and a pair of cylinder levers fulcrumed from each of said side members adjacent its opposite ends, said cylinder levers extending through said openings and having their lower ends connected to the adjacent power means and their upper ends operatively connected respectively to the adjacent auxiliary lever.

5. In a railway car truck the combination of a truck frame comprising a side member, an end rail and a transverse load carrying member, a wheel and axle assembly, and brake rigging comprising live and dead truck levers supported on opposite sides of said wheel, straps connecting the lower ends of said levers, fulcrum means on said side member adjacent the transverse center line of said truck, power means supported on said side member adjacent an end thereof, an auxiliary lever slidably supported on said side member and having its outer end connected to said fulcrum means and its inner end connected to said live truck lever, and a cylinder lever fulcrumed at a point intermediate its ends from said side member and having its lower end connected to said power means and its upper end operatively connected to a point intermediate the ends of said auxiliary lever.

6. In brake rigging for a railway car truck the combination of a truck frame comprising a side frame, a wheel and axle assembly, power means mounted at one end of said side frame, a vertical opening in said side frame adjacent said power means, fulcrum means on said side frame adjacent the transverse center line thereof, live and dead truck levers supported on opposite sides of said wheel and having their lower ends pivotally and adjustably connected to each other, an auxiliary lever slidably supported on said side frame and having its outer end connected to said fulcrum means and its inner end connected to said live lever, a cylinder lever fulcrumed in said opening and directly connected at its lower end to said power means, and a pull rod connected at one end to the upper end of said cylinder lever and at its opposite end to said auxiliary lever.

7. In brake rigging for a railway car truck the combination of a truck frame comprising a side frame, a wheel and axle assembly, power means mounted at one end of said side frame, a vertical opening in said side frame adjacent said power means, fulcrum means on said side frame adjacent the transverse center line thereof, live and dead truck levers supported on opposite sides of said wheel and having their lower ends pivotally and adjustably connected through the medium of straps on opposite sides of said wheel, an auxiliary lever supported on said side frame and having its outer end connected to said fulcrum means and its inner end connected to said live truck lever, and a cylinder lever fulcrumed in said opening and having its lower end connected to said power means and its upper end operatively connected to a point intermediate the ends of said auxiliary lever.

8. In a railway car truck the combination of a truck frame comprising side members and integrally formed end rails, power means mounted on said truck adjacent the junctures of the side members with the end rails, vertical openings in said side members adjacent the longitudinal center line thereof and adjacent said power means respectively, wheel and axle assemblies, auxiliary levers supported on said side members and having their outer ends fulcrumed therefrom, live and dead truck levers supported on opposite sides of each of said assemblies and having their lower ends connected to each other adjacent each wheel, operative connections between said live truck levers and the inner ends of said auxiliary levers, and cylinder levers fulcrumed intermediate their ends in said openings and having their lower ends connected respectively to said power means and their upper ends operatively connected respectively to said auxiliary levers.

9. In a railway car truck the combination of a truck frame comprising side members, end rails and spaced load carrying members integrally formed therewith, wheel and axle assemblies, and brake rigging including power means mounted on opposite ends of said side members, dead truck levers supported outwardly of the wheels, live truck levers supported intermediate the wheels, straps connecting the live and dead truck levers adjacent each wheel, auxiliary levers fulcrumed from said side members intermediate the wheels and having their inner ends connected respectively to said live truck levers, cylinder levers pivotally supported from said side member adjacent said power means and having their lower ends connected respectively to said power means, and pull rods connecting the upper ends of said cylinder levers respectively to points intermediate the ends of said auxiliary levers.

10. In a railway car truck the combination of a truck frame comprising side members and an end rail connected therebetween, power means mounted on said side members adjacent the junctures with said end rail, a wheel and axle assembly, vertical openings formed in said side members adjacent said power means, live and dead truck levers supported on opposite sides of said assembly and having their lower ends connected to each other adjacent each wheel, auxiliary levers slidably supported on said side members and having their inner ends connected respectively to said live truck levers and their outer ends fulcrumed from said side members, cylinder levers fulcrumed in said openings and directly connected respectively to said power means, and pull rods connecting the upper ends of said cylinder levers respectively to points intermediate the ends of said auxiliary levers.

11. In a railway car truck the combination of a truck frame including a side member and an end rail, a wheel and axle assembly, power means mounted on said side member, a dead truck lever supported outwardly of said wheel, a live truck lever supported inwardly of said wheel, straps connecting the lower ends of said levers on opposite sides of said wheel and below said axle, an auxiliary lever having its outer end fulcrumed from said side member and its inner end connected to said live truck lever, and a cylinder lever fulcrumed intermediate its ends from said side member adjacent the longitudinal center line thereof, said cylinder lever having its lower end directly connected to said power means and its upper end operatively connected to said auxiliary lever.

12. In a railway car truck the combination of a truck frame comprising a side member, a wheel and axle, power means mounted on said side member on one side of said wheel, fulcrum means secured to said side member on the opposite side of said wheel, a dead truck lever supported outwardly of said wheel, a live truck lever supported inwardly of said wheel, straps connecting the lower ends of said truck levers, an auxiliary lever having its inner end connected to said live truck lever and its outer end connected to said fulcrum means, a cylinder lever pivotally supported intermediate its ends from said side member and directly connected to said power means, and a pull rod connecting the upper end of said cylinder lever to a point intermediate the ends of said auxiliary lever.

13. In brake rigging for a railway car truck the combination of a truck frame comprising a side frame, a wheel and axle assembly, power means mounted at one end of said side frame, a vertical opening in said side frame adjacent said power means, fulcrum means on said side frame adjacent the transverse center line thereof, a live truck lever supported inwardly of said wheel, a dead truck lever supported outwardly of said wheel, straps pivotally and adjustably connecting the lower ends of said levers, an auxiliary lever having its outer end connected to said fulcrum means and its inner end connected to said live lever, and a cylinder lever fulcrumed in said opening and having its lower end directly connected to said power means and its upper end operatively connected to a point intermediate the ends of said auxiliary lever.

14. In a railway car truck the combination of a truck frame including a side member, a wheel and axle assembly, power means mounted at one end of said side member, a cylinder lever fulcrumed from said side member adjacent said power means and directly connected thereto, an auxiliary lever fulcrumed from said side member inwardly of said wheel and connected intermediate its ends to said cylinder lever, a dead truck lever supported outwardly of said wheel, hangers supporting a live truck lever inwardly of said wheel, straps connecting the lower ends of said truck levers, and an operative connection between said live truck lever and said auxiliary lever.

15. In a railway car truck the combination of a truck frame having a side member, power means mounted thereon, a vertical opening in said member adjacent said power means, a wheel and axle assembly, brake rigging including brake heads and brake shoes supported at opposite sides of said assembly, and connections between said rigging and said power means comprising an auxiliary lever having its outer end fulcrumed from said member and its inner end connected to said rigging, a cylinder lever fulcrumed intermediate its ends in said opening and directly connected to said power means, and an operative connection between said cylinder lever and said auxiliary lever.

16. In a railway car truck the combination of a truck frame having a side member, power means supported on an end thereof, a wheel and axle assembly, brake rigging including brake heads and brake shoes applied at opposite sides of each wheel and operative connections between said brake rigging and said power means, said connections comprising a vertical cylinder lever connected to said power means and fulcrumed from said member intermediate its ends, and a horizontal auxiliary lever fulcrumed from said member at one end, connected to said rigging at the opposite end and connected to said cylinder lever intermediate its ends.

17. In a railway car truck, a truck frame including a side member having a vertical opening and power means mounted thereon adjacent said opening, a wheel and axle assembly, brake rigging including brake heads and brake shoes applied to opposite sides of said assembly, and operative connections between said rigging and said power means, said connections including an auxiliary lever fulcrumed from said frame and connected to said rigging, a cylinder lever fulcrumed in said opening and an operative connection between said cylinder lever and said auxiliary lever.

18. In a railway car truck the combination of a truck frame having a side member, power means mounted thereon, a vertical opening in said member adjacent said power means, a wheel and axle assembly, brake rigging including brake heads and brake shoes supported at opposite sides of said assembly, and connections between said rigging and said power means, said connections comprising a cylinder lever fulcrumed in said opening, an auxiliary lever having an end fulcrumed from said member and its opposite end connected to said rigging, and a pull rod connecting said cylinder lever and said auxiliary lever.

19. In a railway car truck the combination of a truck frame having a side member, power means supported on an end thereof, a wheel and axle assembly, brake rigging including brake heads and brake shoes applied at opposite sides of each wheel, and operative connections between said brake rigging and said power means, said connections comprising a vertical cylinder lever and a horizontal auxiliary lever fulcrumed from said member and connected to each other.

20. In a railway car truck the combination of a truck frame having a side member, power means mounted on an end thereof, a wheel and axle assembly, brake rigging comprising brake heads and brake shoes supported at opposite sides of said assembly, and operative connections between said power means and said brake rigging comprising a cylinder lever vertically fulcrumed in said member and a horizontal auxiliary lever fulcrumed from said member.

RAY G. AURIEN.